(12) United States Patent
Hall

(10) Patent No.: US 11,010,099 B1
(45) Date of Patent: May 18, 2021

(54) DATA STORAGE DEVICE EXECUTING ACCESS COMMANDS BASED ON LEAPFROG SORT

(71) Applicant: Western Digital Technologies, Inc., San Jose, CA (US)

(72) Inventor: David R. Hall, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 57 days.

(21) Appl. No.: 16/688,853

(22) Filed: Nov. 19, 2019

(51) Int. Cl.
*G06F 3/06* (2006.01)

(52) U.S. Cl.
CPC ............ *G06F 3/0659* (2013.01); *G06F 3/061* (2013.01); *G06F 3/0674* (2013.01)

(58) Field of Classification Search
CPC ....... G06F 3/0659; G06F 3/061; G06F 3/0674
See application file for complete search history.

(56) References Cited

U.S. PATENT DOCUMENTS

| 5,729,718 | A | * | 3/1998 | Au | ........................ | G11B 5/012 360/48 |
| 6,182,166 | B1 | * | 1/2001 | Shklarsky | ........... | H04L 67/1095 709/213 |
| 6,848,019 | B1 | * | 1/2005 | Mobley | ................ | G11B 5/5547 360/78.01 |
| 8,327,093 | B2 | | 12/2012 | Olds et al. | | |
| 10,310,923 | B1 | | 6/2019 | DeRosa et al. | | |
| 2003/0229755 | A1 | | 12/2003 | Espeseth et al. | | |
| 2005/0071830 | A1 | * | 3/2005 | Naveh | .................... | G06F 9/3836 717/151 |
| 2012/0317315 | A1 | * | 12/2012 | Darisala | ................ | G06F 3/0671 710/10 |
| 2013/0086360 | A1 | * | 4/2013 | Zeng | .................... | G06F 9/30032 712/205 |
| 2014/0068161 | A1 | * | 3/2014 | Yi | ........................ | G06F 12/0246 711/103 |
| 2014/0101381 | A1 | * | 4/2014 | Svendsen | ............ | G06F 11/3037 711/105 |
| 2014/0164737 | A1 | * | 6/2014 | Collange | ............. | G06F 9/30058 712/205 |
| 2018/0260115 | A1 | * | 9/2018 | Hara | ..................... | G06F 3/0659 |

* cited by examiner

*Primary Examiner* — Hiep T Nguyen

(57) ABSTRACT

A data storage device is disclosed comprising a head actuated over a non-volatile storage medium. A plurality of access commands are received from a host and sored in a host queue and a pending queue. A first access command is selected from the host queue, wherein the first access command having a first execution time needed to execute the first access command. When a second access command in the pending queue can be executed within the first execution time, the second access command is executed, and after executing the second access command, the first access command in the host queue is executed. After selecting the first access command from the host queue, a third access command is transferred from the pending queue to the host queue based on a first-in-first-out (FIFO) order of the pending queue.

20 Claims, 10 Drawing Sheets

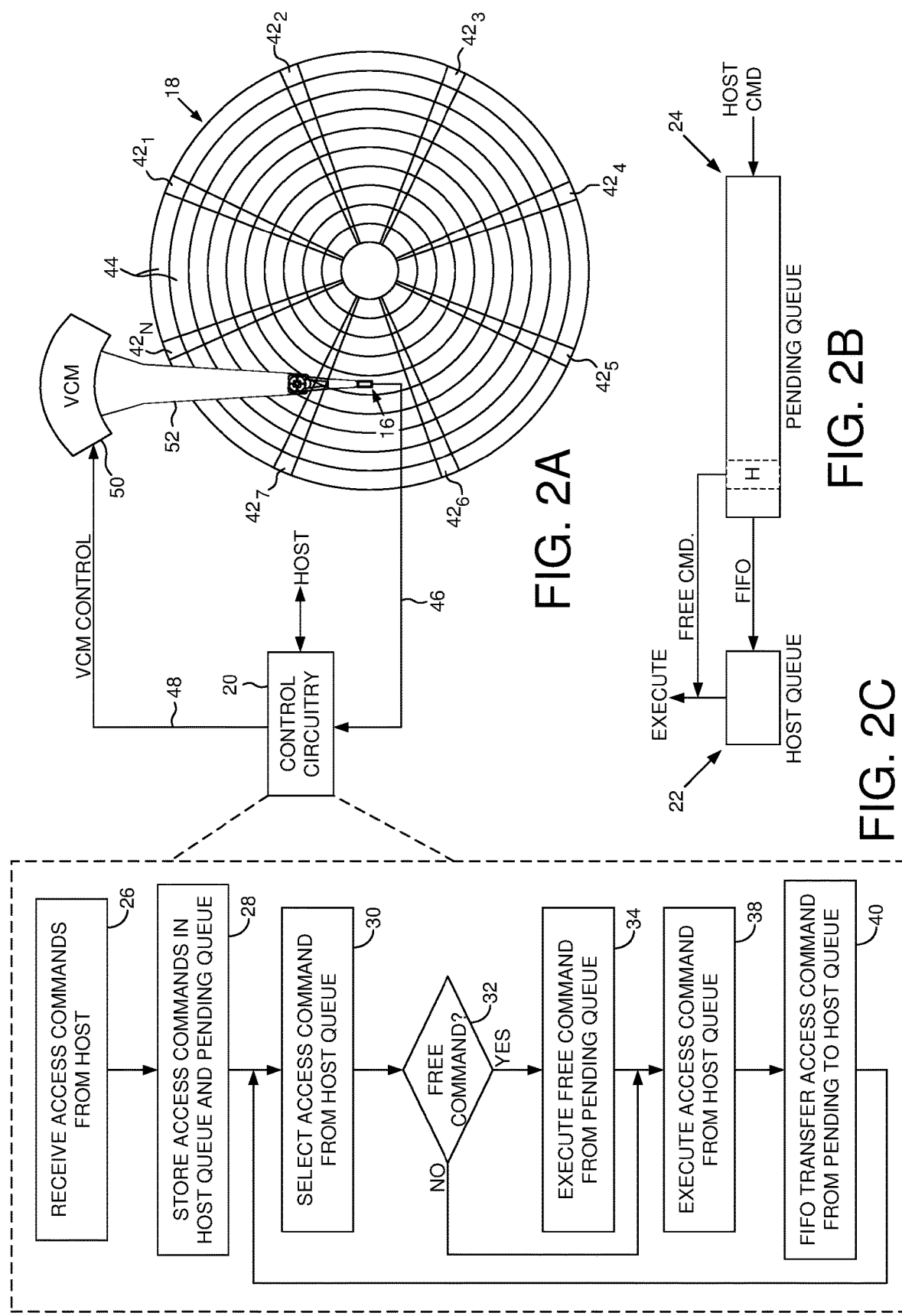

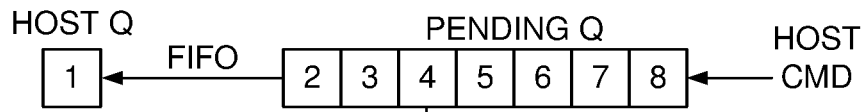
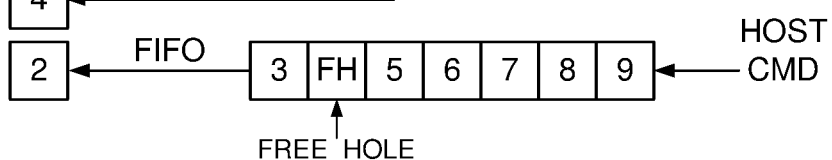
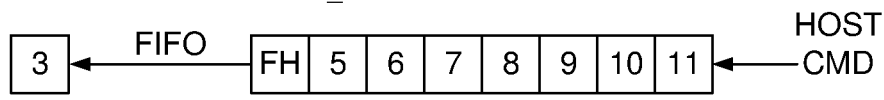
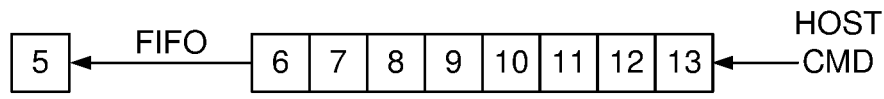

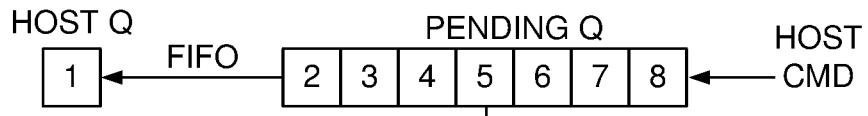
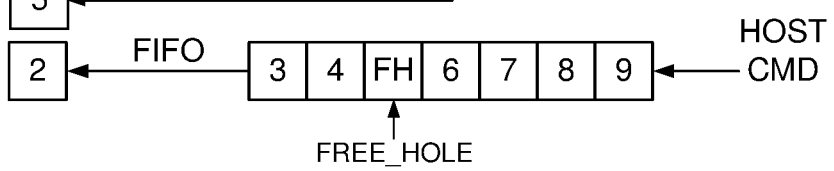
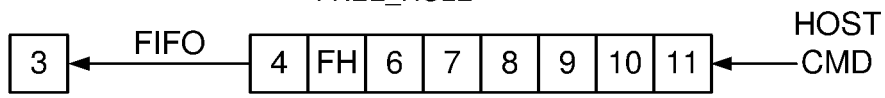
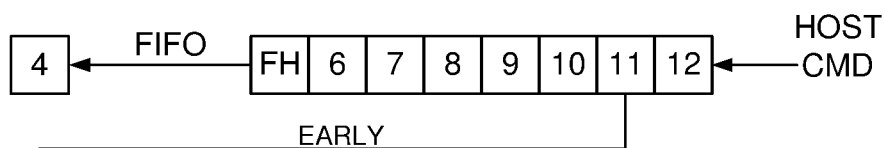
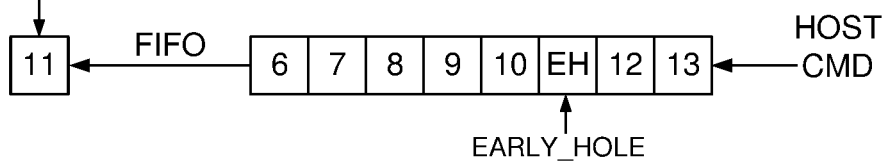
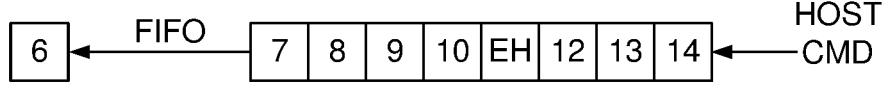
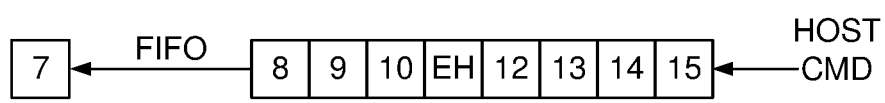
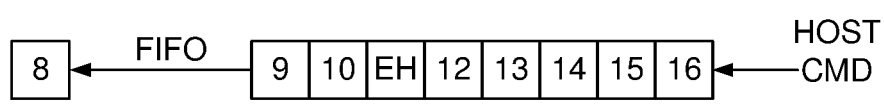
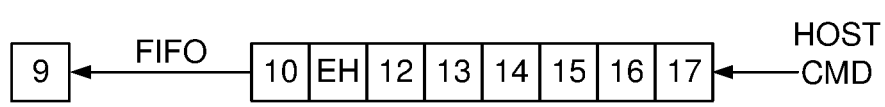
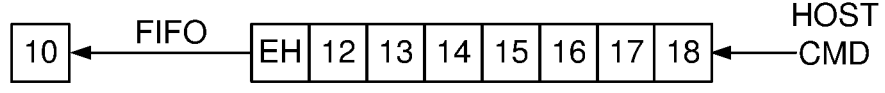
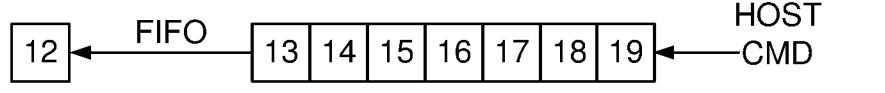

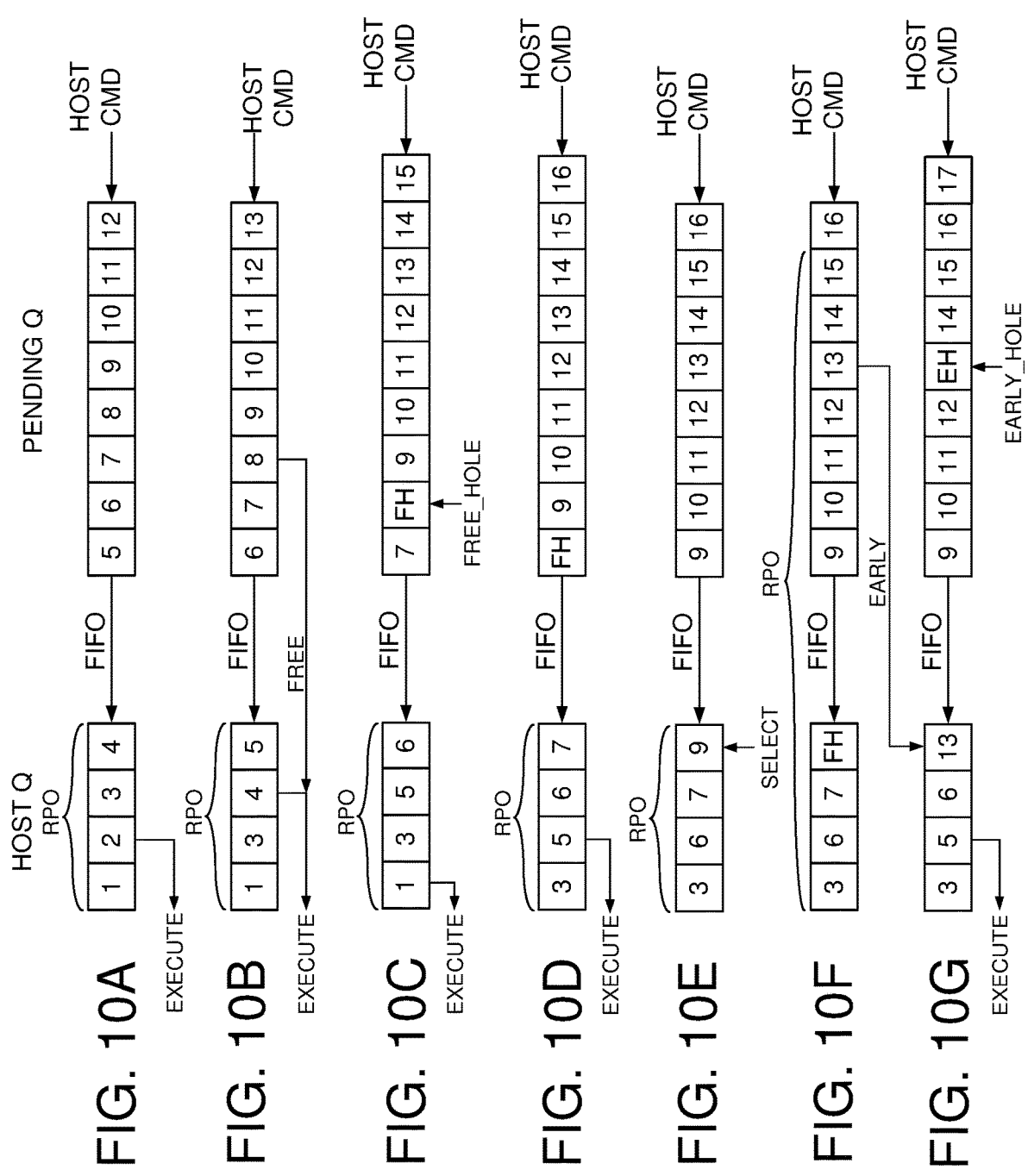

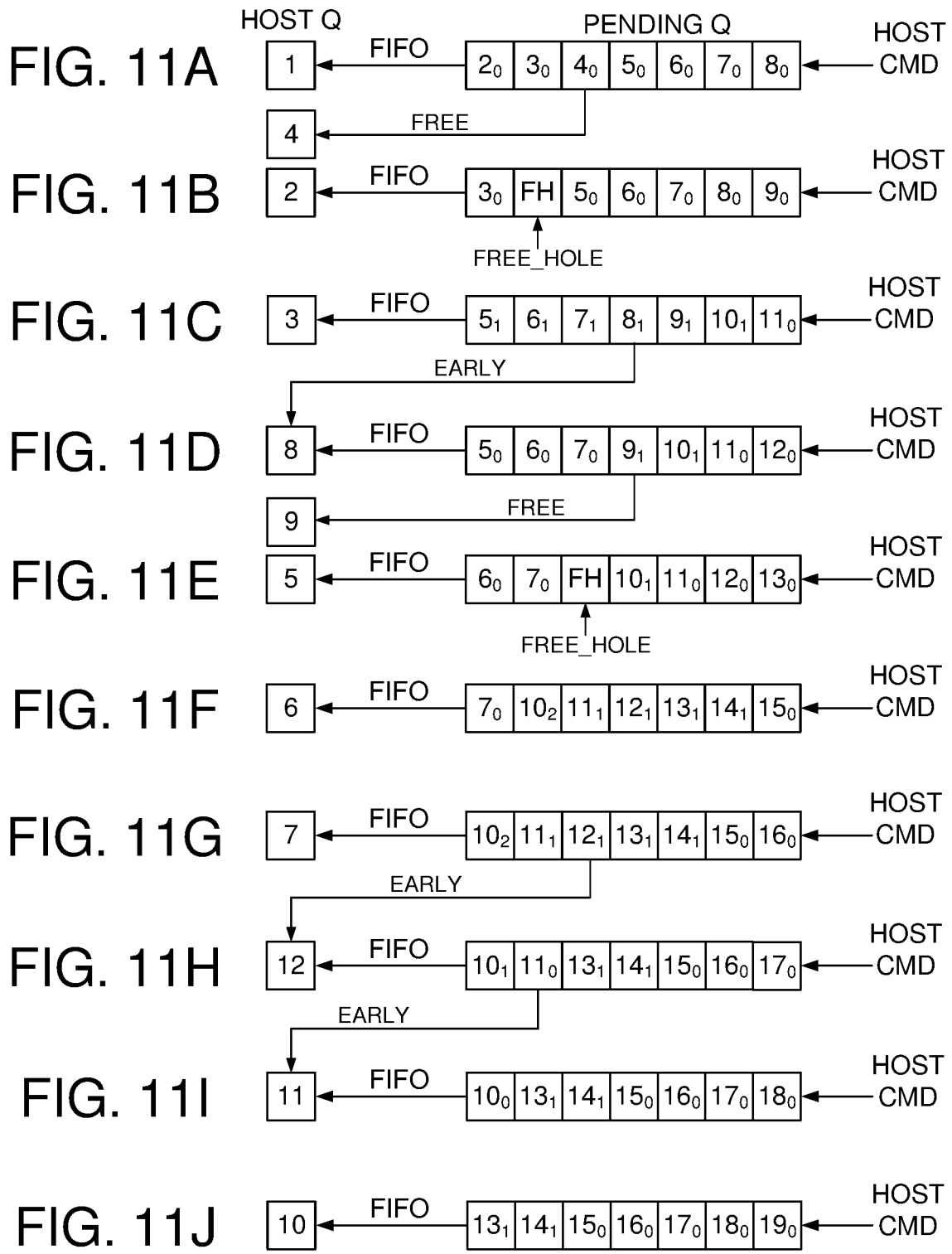

DATA STORAGE DEVICE EXECUTING ACCESS COMMANDS BASED ON LEAPFROG SORT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a non-volatile storage medium (a disk in this embodiment).

FIG. 2B shows an embodiment wherein the disk drive comprises a host queue and a pending queue, wherein host access commands are transferred to the host queue for execution in a first-in-first-out (FIFO) order.

FIG. 2C is a flow diagram according to an embodiment wherein when an access command in the pending queue can be executed within the execution time of an active access command, the access command in the pending queue (free command) is leapfrog executed which increases the throughput (input/output instructions per second or IOPs) of the disk drive.

FIGS. 4A-4C show different examples of how an access command in the pending queue (free command) may be executed during the execution time of an active access command according to an embodiment.

FIGS. 5A-5D show an embodiment wherein the execution of a free command creates a free hole command in the pending queue which is filled by shifting up the remaining commands in the pending queue.

FIGS. 8A-8K show an embodiment wherein any of the access commands in the pending queue when a free command is executed may be executed as an early command when the free hole command reaches the host queue.

FIGS. 10A-10G show an embodiment wherein a rotational position optimization (RPO) algorithm is executed on four access commands of the host queue.

FIGS. 11A-11J show an alternative embodiment wherein each access command in the pending queue inserted after a free command (except the last inserted command) is awarded a jump credit meaning that it can be leapfrog executed by a later-inserted access command.

DETAILED DESCRIPTION

Figure 1:
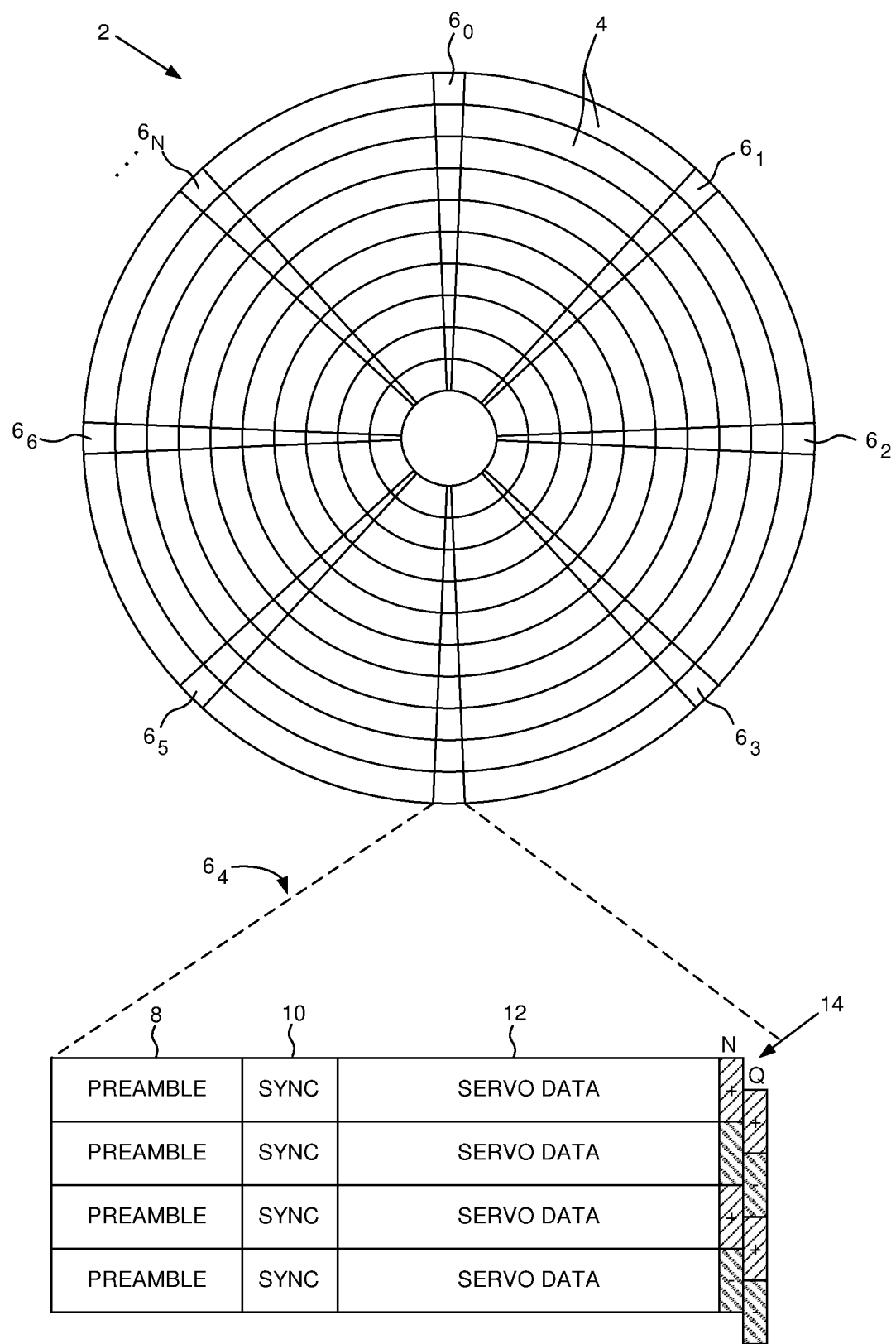
FIG. 1 shows a prior art disk format comprising a plurality of servo tracks defined by servo sectors.

While a disk drive with rotating magnetic media is used in the illustrative examples below, the data storage device of the various embodiments can instead include (or additionally include) various other types of non-volatile storage media, such as magnetic tape media, optical media, etc. FIG. 2A shows a data storage device in the form of a disk drive according to an embodiment comprising a head 16 actuated over a non-volatile storage medium (a disk 18 in this embodiment). The disk drive further comprises control circuitry 20 configured to implement a host queue 22 and a pending queue 24 as shown in FIG. 2B. The control circuitry 20 is further configured to execute the flow diagram of FIG. 2C, wherein a plurality of access commands are received from a host (block 26). At least one of the access commands is stored in the host queue and at least one of the access commands is stored in the pending queue (block 28). A first access command is selected from the host queue (block 30), wherein the first access command having a first execution time needed to execute the first access command. When a second access command in the pending queue can be executed within the first execution time (block 32), the second access command is deemed a "free command" and is executed (block 34). An example determination of a "free command" will be further described below with respect to FIGS. 4A-4C, for example. After executing the second access command, the first access command in the host queue is executed (block 38). After selecting the first access command from the host queue, a third access command is transferred from the pending queue to the host queue based on a first-in-first-out (FIFO) order of the pending queue (block 40).

In the embodiment of FIG. 2A, the disk 18 comprises a plurality of servo sectors $42_1$-$42_N$ that define a plurality of servo tracks, wherein data tracks 44 are defined relative to the servo tracks at the same or different radial density. The control circuitry 20 processes a read signal 46 emanating from the head 16 to demodulate the servo sectors and generate a position error signal (PES) representing an error between the actual position of the head and a target position relative to a target track. A servo control system in the control circuitry 20 filters the PES using a suitable compensation filter to generate a control signal 48 applied to a VCM 50 which rotates an actuator arm 52 about a pivot in order to actuate the head radially over the disk surface in a direction that reduces the PES). In one embodiment, the head 16 may be actuated over the disk 18 based on the PES using one or more secondary actuators, for example, a microactuator that actuates a suspension coupling a head slider to the actuator arm 52, or a microactuator that actuates the head slider relative to the suspension (e.g., using a thermal actuator, piezoelectric actuator, etc.). The servo sectors $42_1$-$42_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3A:
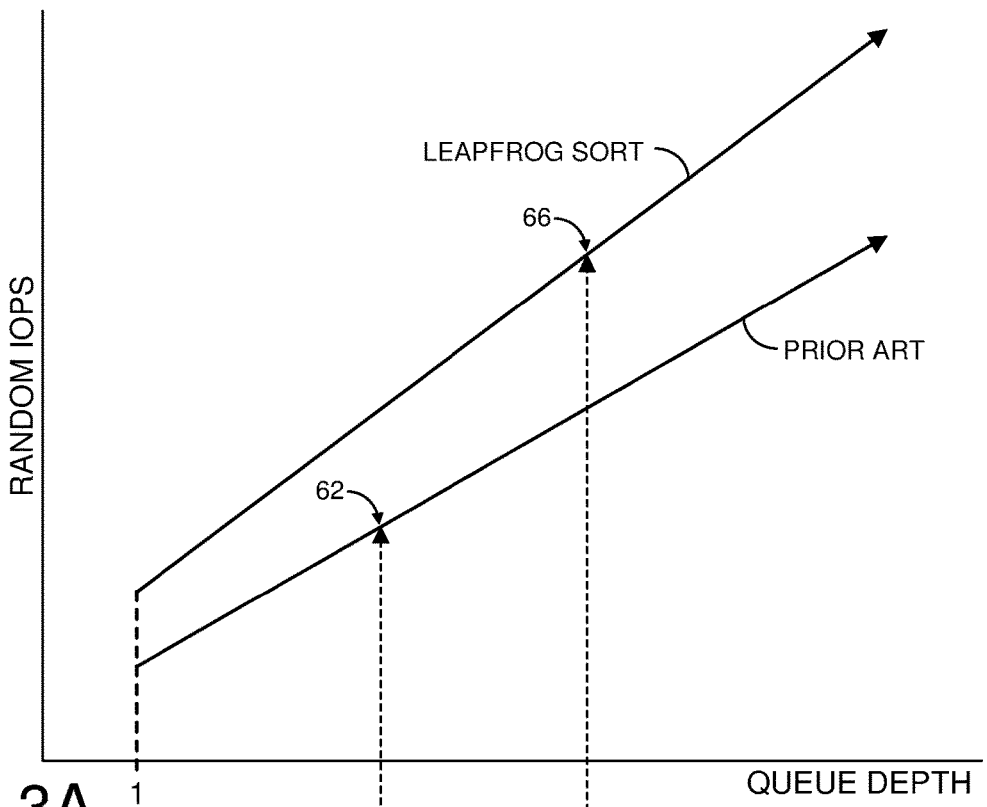
FIG. 3A shows that in prior art data storage devices implementing a conventional host queue, the random IOPS increases as the host queue depth increases.
Figure 3B:
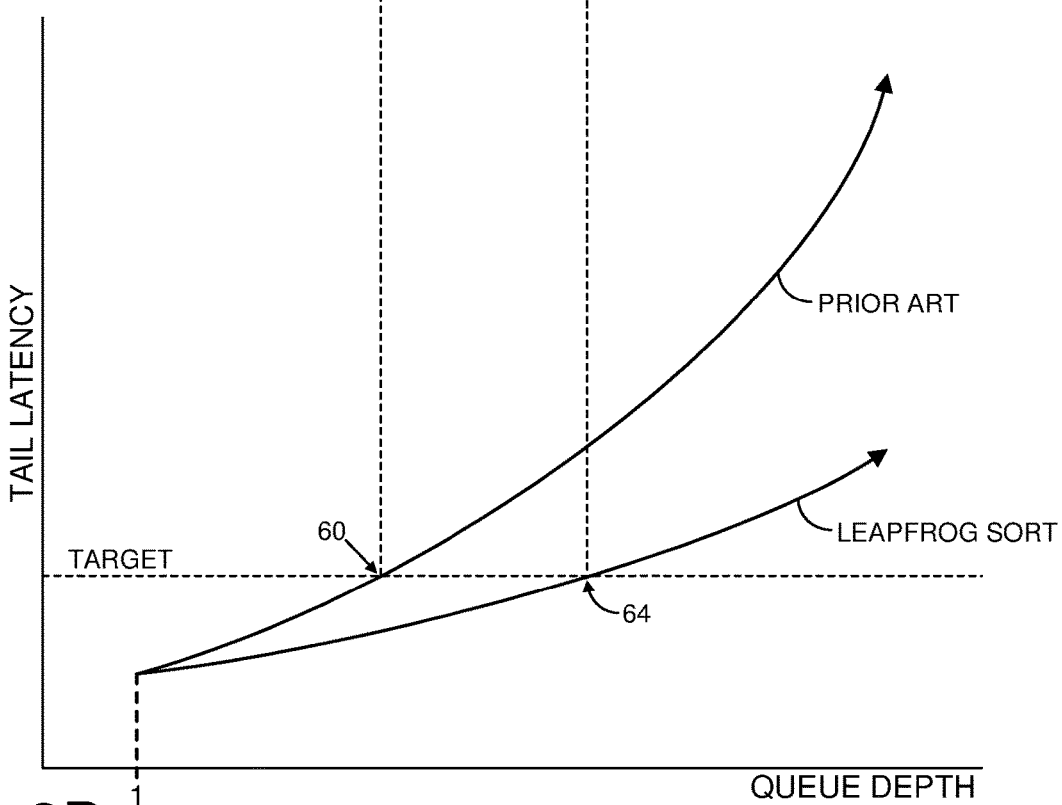
FIG. 3B shows that in prior art data storage devices implementing a conventional host queue, the tail latency of the host access commands increases exponentially as the host queue depth increases.

In conventional disk drives, a plurality of access commands received from the host are stored in a host queue and then selected from the host queue for execution based on any suitable rotation position optimization (RPO) algorithm. An RPO algorithm sorts the access commands in the host queue into an order that minimizes the execution times of the access commands by minimizing the access latency (e.g., seek latency of the head and rotation latency of the disk), thereby maximizing the throughput of the disk drive (random IOPS). FIG. 3A shows that as the host queue depth increases, there is an increase in the number of random IOPS serviced by the disk drive. However as the host queue depth increases, the tail latency of the access commands increases exponentially as shown in FIG. 3B (where the tail latency may be defined as the time required to execute 99% of the access commands stored in the host queue). The tail latency increases due to the RPO algorithm sorting the access commands to minimize access latency, which necessarily increases the aging of some of the access commands that are deferred by the RPO algorithm. In certain applications, the host cannot tolerate an excessive tail latency of the access commands; that is, the host may require that all of the access commands sent to the disk drive be completed within a predetermined tail latency. For instance, the host may limit the depth of the host queue in the disk drive to effectively guarantee a corresponding tail latency such as shown in FIG. 3B. In some applications, the host may limit the depth of the host queue to a single access command, thereby minimizing the tail latency of the disk drive. However, limiting the depth of the host queue so as to achieve a specific tail latency reduces the number of random IOPS that could otherwise be serviced by the disk drive as shown in FIG. 3A. That is, the throughput of the disk drive is reduced in order to achieve a target tail latency as perceived by the host.

Accordingly in the embodiments described herein, the control circuitry 20 implements a host queue 22 and a pending queue 24 together with a novel leapfrog sort algorithm that provides an increase in the random IOPS while achieving a target tail latency as shown in FIGS. 3A and 3B. That is, the leapfrog sort algorithm enables an effective increase in the host queue depth and a corresponding increase in random IOPS while still achieving a target tail latency as seen from the host. As shown in FIGS. 3A and 3B, the leapfrog sort algorithm can increase the number of random IOPS as compared to the prior art even when the depth of the host queue is one (a single access command). In one embodiment shown in FIG. 2B, the increase in random IOPS is achieved by implementing a host queue 22 for storing one or more active access commands, together with a pending queue for storing a number of pending access commands. If while executing an active access command from the host queue it is possible to execute a pending access command from the pending queue without delaying the active access command (i.e., within the execution time of the active access command), the pending access command in the pending queue is "leapfrog" executed along with the active access command. The "leapfrog" executed access command is referred to as a "free command" since it does not impact the access latency associated with executing the active access command from the host queue. After an active access command is selected from the host queue for execution, the next pending access command from the pending queue is shifted into the host queue in a FIFO order. In this manner, the access commands in the host queue are executed with a target tail latency but with an increase in random IOPS due to the leapfrog execution of free commands selected from the pending queue.

FIG. 4A illustrates an example of a "free command" that may be executed after completing a first host access command (CMD1) and while executing a second host access command (CMD2). In this example, the free command may be executed during the rotational latency of the disk when the head arrives at the target track early prior to reaching CMD2. In another example shown in FIG. 4B, a free command may be executed during the rotational latency of the disk and prior to seeking the head to the target track of CMD2. In yet another example shown in FIG. 4C, a free command may be executed during the rotational latency of the disk by performing two seeks: a first seek to an interim track of the free command, and then a second seek to the target track of CMD2. In each of these examples, there is an execution time associated with executing CMD2 (including a seek latency and rotational latency), wherein the free command can be executed during the execution time of CMD2 (i.e., without delaying the execution of CMD2). The free command is said to be "leapfrog" executed since it is executed out of the FIFO order (i.e., leapfrogging the earlier access commands in the pending queue).

FIGS. 5A-5D show an example embodiment wherein the depth of the host queue is one (a single access command) and the depth of the pending queue is eight. In FIG. 5A, the active access command "1" is executed and the next pending access command "2" in the pending queue is shifted into the host queue in a FIFO order. The control circuitry 20 determines that a free command (pending access command "4") can be executed during the execution time of active access command "2" and so both commands are executed as shown in FIG. 5B, thereby creating a hole command in the pending queue in place of the pending access command "4". After executing access commands "2" and "4", the next pending access command "3" is shifted into the host queue and executed as shown in FIG. 5C. After executing access command "3", the next pending access command in the pending queue is the hole command, wherein in one embodiment the hole command is simply skipped such that the following pending access command "5" is shifted into the host queue as shown in FIG. 5D. In one embodiment, the host is unable to process the access commands out of order (e.g., when the access commands are read commands). Accordingly in one embodiment, the control circuitry 20 may buffer the data associated with the free command (pending access command "4") and then transfer the data to the host in an excepted sequential order (i.e., after executing access command "3").

Although the example of FIGS. 5A-5D illustrate the execution of a single free command that creates a single hole command in the pending queue, in one embodiment there may be multiple free commands executed during the execution time of an active access command (host queue command), thereby creating multiple hole commands in the pending queue. There may also be multiple hole commands created in the pending queue due to the frequent execution of free commands (e.g., one or more free commands may be executed during each of a consecutive or near consecutive execution of active access commands in the host queue).

Figure 6A:
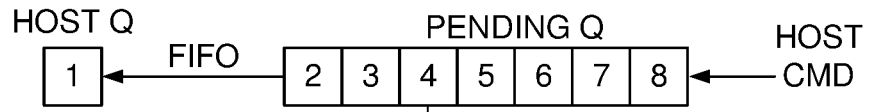
FIGS. 6A-6D show an embodiment wherein the execution of a free command creates a free hole command in the pending queue which is filled by an early command in the pending queue.
Figure 6B:
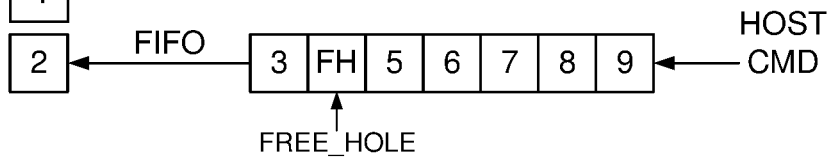
Figure 6C:
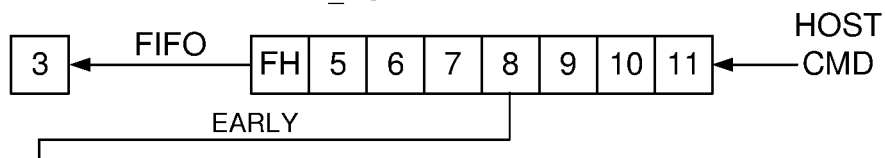
Figure 6D:
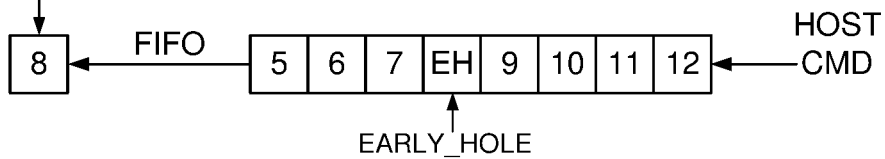

FIGS. 6A-6D show an alternative embodiment wherein instead of skipping a hole command as in FIG. 5D, one of the pending access commands is selected from the pending queue for execution in place of the hole command. In the example of FIG. 6C, pending access command "8" is selected from the pending queue for early execution in place of the hole command. In one embodiment, the control circuitry 20 may select a pending access command from the pending queue having an execution time that is equal to or less than the execution time of the access command that created the hole command. In the example of FIG. 6B, the pending access command "4" executed as a free command created the hole command in the pending queue. Assuming pending access command "4" was not executed early as a free command, there would have been an execution time associated with executing access command "4" after executing access command "3". According when selecting an early command to execute in place of the hole command as shown in FIG. 6D, the control circuitry 20 may select a pending access command with an execution time that fits within the execution time of access command "4" (had access command "4" been executed in order). In this manner, the tail latency of the access commands as seen from the host remains within the target tail latency, particularly when the host is able to process the access commands out of order.

In another embodiment, the control circuitry 20 may select a pending access command from the pending queue to execute in place of a hole command such as shown in FIG. 6C based on an average execution time of the access commands rather than the actual execution time of the corresponding free command. That is, the control circuitry may select any pending access command within the pending queue having an execution time that is within the average execution time of the access commands in order to ensure the tail latency remains within the target tail latency. In one embodiment, the average execution time of the access commands may be predetermined based on the known operating parameters of the disk drive, and in an alternative embodiment the average execution time of the access commands may be determined based on a history of active access commands executed over a predetermined interval.

Figure 7A:
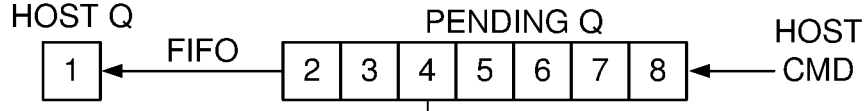
FIGS. 7A-7D show an embodiment wherein the execution of a free command creates a free hole command in the pending queue which is filled by two early commands in the pending queue.
Figure 7B:
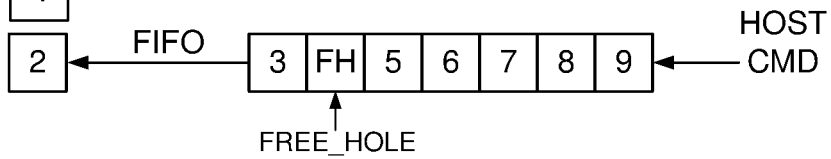
Figure 7C:
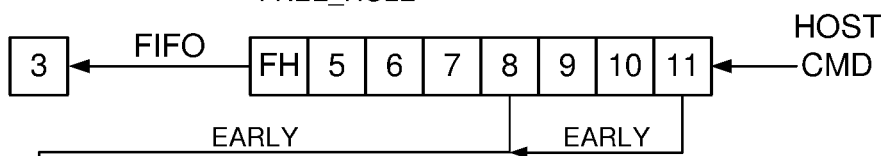
Figure 7D:
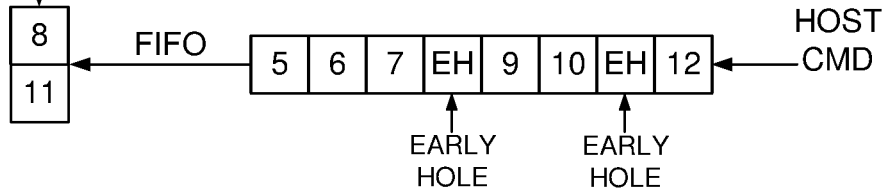

FIGS. 7A-7D show an embodiment wherein the control circuitry 20 may select multiple pending access commands from the pending queue for early execution in place of a hole command when the combined execution time of executing the multiple pending access commands fits within the actual execution time associated with the hole command, or the average execution time of the access commands as described above. In the example of FIG. 7C, the combined execution times of pending access commands "8" and "11" fits within the actual execution time of the hole command or the average execution time of the access commands.

In one embodiment, the control circuitry 20 may accumulate a remaindered execution time associated with executing an early command(s) in place of a hole command. Referring to the example of FIG. 6C, early command "8" may be executed in less time than the allocated execution time (e.g., the actual or average execution time described above), and so the remainder execution time may be accumulated. When the next hole command is processed, the accumulated execution time may be added to the actual or average execution time of the hole command when selecting one or more of the pending access commands for early execution.

Figure 9A:
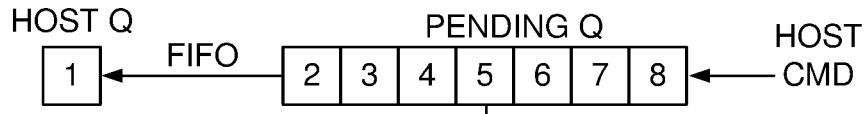
FIGS. 9A-9K show an embodiment wherein early execution of an access command inserted into the pending queue after executing a free command will excessively delay at least one of the pending access commands.
Figure 9B:
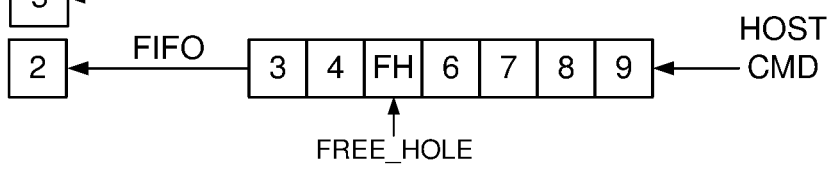
Figure 9C:

In one embodiment when a free command is executed from the pending queue, only the pending access commands that are in the pending queue may be executed early (leapfrog executed). Access commands inserted into the pending queue after a free command has been executed are not allowed to be executed as an early command in place of the corresponding free hole command. This embodiment is understood with the examples shown in FIGS. 8A-8K and 9A-9K wherein access command 5 is executed as a free command together with access command 2 (FIGS. 8B and 9B), thereby creating a free hole (FH) command in the pending queue. After executing access commands 2 and 5, two new access commands 10 and 11 are received from the host (FIGS. 8C and 9C). At this point, any of the pending access commands 6-11 may be leapfrog executed as an early command when the free hole command reaches the host queue without increasing the expected execution time of any of the pending access commands. In the example of FIGS. 8D-8K, access command 11 may be executed early at FIG. 8E without increasing the execution time of the other pending access commands (e.g., access command 10 is executed within seven command slots at FIG. 8J).

Figure 9D:
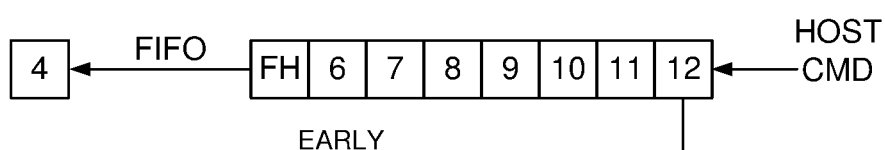
Figure 9E:
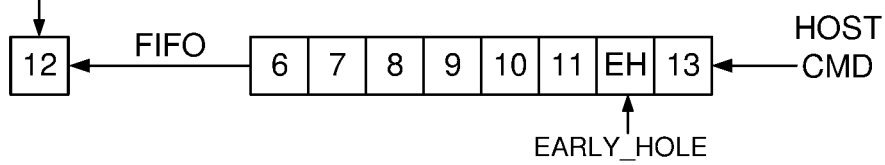
Figure 9F:
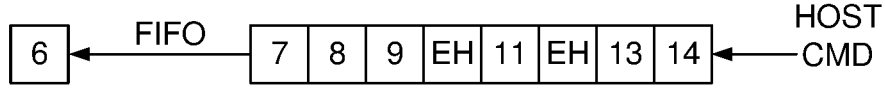
Figure 9G:
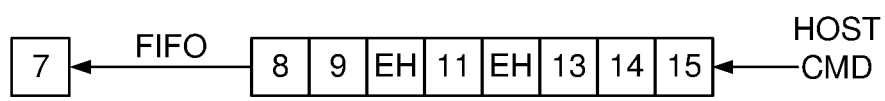
Figure 9H:
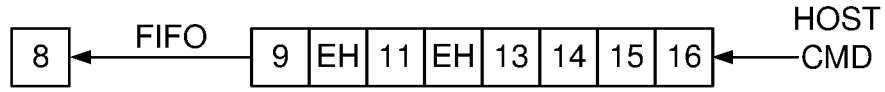
Figure 9I:
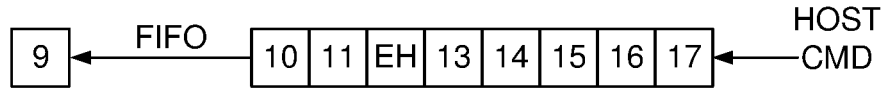
Figure 9J:
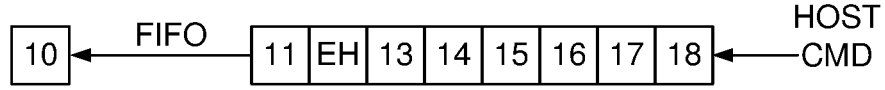
Figure 9K:
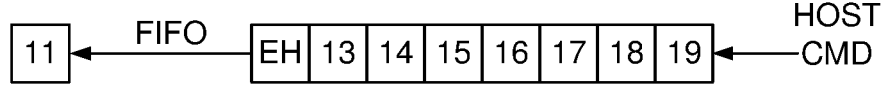

On the other hand, if an access command not yet in the pending queue when a free command is executed is leapfrog executed early, it can increase the expected execution time of at least one of the pending access commands. Referring to FIG. 9D, access command 12 is inserted into the pending queue after executing free command 5. If access command 12 is leapfrog executed in place of the free hole command as shown in FIG. 9E, it will increase the execution time of access command 11 by one command slot. That is, access command 11 will be executed in eight command slots (FIGS. 9C-9K) instead of the expected seven time slots (FIG. 8C-8K).

In the embodiment of FIGS. 8A-8K and 9A-9K, when an early hole (EH) command reaches the host queue such as shown in FIG. 8J, the next access command in the pending queue is executed in place of the early hole command. For example, in FIG. 8K access command 12 is executed in place of the early hole command in the FIFO order so as to avoid increasing the execution time of access command 12 (as well as the following access commands). That is, in order for access command 12 to be executed in the expected seven command slots, the pending access commands are processed in the FIFO order when the early command reaches the host queue (i.e., the early hole command is effectively skipped).

In an embodiment wherein the host is unable to process the access commands in an out of order sequence, the host may configure the disk drive to limit certain parameters of the leapfrog sort algorithm so as not to exceed a target tail latency of sequentially processed access commands. For example, the host may configure the disk drive to limit a frequency of the free commands that can be executed (e.g., a maximum of N free commands out of every M access commands). In another embodiment, the host may restrict the number of early commands that may be executed, for example, by disabling early commands altogether or by limiting the frequency of early commands similar to limiting the frequency of free commands.

FIGS. 10A-10G show an embodiment wherein the depth of the host queue may be greater than one (four in this example). In this embodiment, the control circuitry 20 may execute a suitable RPO algorithm in order to sort the access commands in the host queue into an execution order that minimizes the access latency. In the example of FIG. 10A, the RPO algorithm selects access command "2" from the host queue as the next executed access command. In FIG. 10B, the RPO algorithm selects access command "4" as the next executed access command, and also selects pending access command "8" to execute as a free command together with active access command "4", thereby creating a hole command in the pending queue as shown in FIG. 10C. When the hole command is shifted into the host queue, the free hole command may become a "placeholder" filled by the next access command in the pending queue (FIFO order) such as access command 9 as shown in FIG. 10D and FIG. 10E. If the RPO algorithm selects the placeholder command from the host queue as the next command to execute, the placeholder command may be substituted with the access command from the pending queue having the smallest access latency via the RPO algorithm. The RPO algorithm is executed over the pending access commands that were in the pending queue when the free command was executed (i.e., the RPO algorithm is executed over the pending access commands that can be leapfrog executed without delaying the execution time of other pending access commands as described above). In the example of FIG. 10F, the RPO algorithm is executed over the access commands in the host queue together with access commands 9-15 which were in the pending queue when the free command 8 was executed (FIG. 10C). In the example of FIG. 10G, access command 13 is selected to execute early in place of the free hole command. When the corresponding early hole (EH) command reaches the host queue, the next pending access command from the pending queue is transferred to the host queue in the FIFO order (i.e., the early hole command is skipped) and the RPO algorithm executed over the access commands in the host queue.

In another embodiment, an early command may be selected from the pending queue randomly to fill a free hole command in the host queue. If the randomly selected access command from the pending queue is a free hole command or an early hole command, then the access command with the smallest access latency may be selected from the pending queue via the RPO algorithm for insertion into the host queue as described above with reference to FIG. 10E.

In an alternative embodiment when a free hole command is shifted into the host queue from the pending queue, the free hole command may be skipped by replacing the free hole command with the next pending access command in the pending queue (in the FIFO order) similar to the embodiment described above with reference to FIGS. 5A-5D. For example, a free hole command may be skipped in an embodiment where the host is unable to process the access commands in an out-of-order sequence.

In an embodiment wherein the depth of the host queue is greater than one (such as shown in FIGS. 10A-10F), it is possible for an access command to exceed its expected execution time due to being deferred by the RPO algorithm. In one embodiment, the control circuitry 20 may alleviate this aging problem by implementing any suitable constraint on the aging of access commands in the host queue, such as by overriding the RPO algorithm when the age of any access command in the host queue exceeds a limit.

FIGS. 11A-11J show an alternative embodiment wherein each access command in the pending queue inserted after a free command (except the last inserted command) is awarded a jump credit meaning that it can be leapfrog executed by a later-inserted access command. In effect, this embodiment implements a different tracking mechanism for enabling the execution of early commands as compared to maintaining and processing free hole commands as in the above described embodiments. In this embodiment, when an access command received from the host is inserted into the pending queue it is assigned a zero jump credit (represented by a zero subscript in FIG. 11A). When a free command is executed such as shown in FIG. 11B, all of the access commands in the pending queue after the free command (except the last inserted command) is awarded a jump credit and the free hole (FH) command is deleted from the pending queue such as shown in FIG. 11C. Any of the access commands having at least one jump credit may be leapfrog executed by a later access command, and when an access command is leapfrog executed by a later access command, its jump credit is decremented. In the example of FIG. 11D, access command 8 is leapfrog executed as an early command which causes the jump credit of access commands 5-7 to be decremented. In the example of FIG. 11E, access command 9 is executed as a free command together with access command 5, and so the jump credit for access commands 10-14 is incremented as shown in FIG. 11F. Access commands 6 and 7 are executed in the FIFO order as shown in FIGS. 11F and 11G since their jump credit is zero. When access command 10 reaches the head of the pending queue, access command 12 can be executed as an early command since all of the preceding access commands have a jump credit greater than zero. Executing access command 12 as an early command causes the jump credit of access commands 10 and 11 to be decremented as shown in FIG. 11H. At FIG. 11I access command 11 is executed as an early command since access command 10 has a non-zero jump credit. At FIG. 11J access command 10 is executed since its jump credit has been decremented to zero (i.e., a later access command cannot leapfrog execute access command 10). Similar to the above described embodiments, in this embodiment each of the pending access commands is guaranteed to be executed within at least the number of command slots in the pending queue (e.g., after being inserted into the pending queue access command 10 is executed in seven command slots as shown in FIG. 11A-11J).

Figure 12:
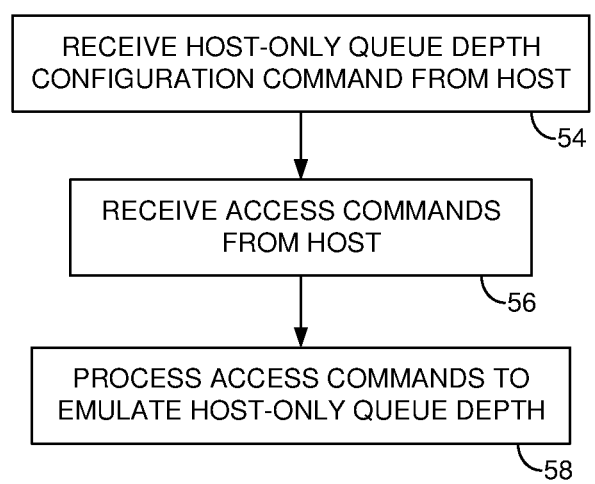
FIG. 12 is a flow diagram according to an embodiment wherein the control circuitry receives a configuration command from host to emulate a depth of a host-only queue in the absence of the pending queue.

FIG. 12 is a flow diagram according to an embodiment wherein the control circuitry is configured to receive a configuration command from the host to emulate a depth of a host-only queue in the absence of the pending queue (block 54). A plurality of host commands are received from the host (block 56), and the plurality of access commands are processed using the host queue and the pending queue in order to emulate the depth of the host-only queue (block 58).

Referring to the example of FIGS. 3A and 3B, the host may transmit a configuration command to the data storage device to configure a host-only queue depth 60 which would conventionally provide a random IOPs performance 62. However, when the access commands are processed using a host queue and a pending queue as in the above described embodiments, emulating the host-only queue depth 60 provides the target tail latency 64 but with an increase in the random IOPs 66. Accordingly this embodiment enables the host to configure the data storage device to provide an expected latency performance of a conventional host-only queue depth while benefiting from an increase in random IOPs due to the leapfrog sort embodiments described above.

In one embodiment, the host may transmit a configuration command to the disk drive to emulate a depth of a host-only queue in the absence of the pending queue as described above, and also transmit a starting jump credit for the access commands inserted into the pending queue. Referring to the example of FIGS. 11A-11J, in one embodiment the host may specify a host-only queue depth greater than one (e.g., four), and also specify a non-zero starting jump credit for new access commands inserted into the pending queue, wherein the non-zero starting jump credit results in a controlled amount of tail latency as seen from the host. That is, the tail latency corresponding to a host-only queue depth greater than one as shown in FIG. 3B may be emulated using a host queue depth of one as shown in FIGS. 11A-11J together with a non-zero starting jump credit that will result in the target tail latency rather than having the tail latency be a side effect of an RPO algorithm.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

While the above examples have used a disk drive for illustration, the data storage device of the various embodiments can instead include (or additionally include) various other types of non-volatile media, such as non-volatile semiconductor memory, magnetic tape media, optical media, etc. In various embodiments, a disk drive may include a magnetic disk drive, an optical disk drive, a hybrid disk drive (with solid-state memory and rotating magnetic media), etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a non-volatile storage medium;
a head actuated over the non-volatile storage medium; and
control circuitry configured to:
  receive a plurality of access commands from a host;
  store at least one of the access commands in a host queue and store at least one of the access commands in a pending queue;
  select a first access command from the host queue, wherein the first access command having a first execution time needed to execute the first access command;
  when a second access command in the pending queue can be executed within the first execution time, execute the second access command;
  after executing the second access command, execute the first access command in the host queue; and
  after selecting the first access command from the host queue, transfer a third access command from the pending queue to the host queue based on a first-in-first-out (FIFO) order of the pending queue.

2. The data storage device as recited in claim 1, wherein:
executing the second access command creates a free hole command in the pending queue; and when the free hole command reaches the host queue, the control circuitry is further configured to execute a fourth access command in the pending queue in place of the free hole command.

3. The data storage device as recited in claim 2, wherein the fourth access command is the next access command in the FIFO order of the pending queue.

4. The data storage device as recited in claim 2, wherein fourth access command is out of the FIFO order of the pending queue, thereby creating an early hole command in the pending queue.

5. The data storage device as recited in claim 1, wherein:
executing the second access command creates a free hole command in the pending queue; and
when the free hole command reaches the host queue, the control circuitry is further configured to execute a fourth access command and a fifth access command in place of the free hole command and within a second execution time associated with executing the second access command in the FIFO order.

6. The data storage device as recited in claim 5, wherein the second execution time associated with executing the second access command in the FIFO order is an actual execution time of the second access command.

7. The data storage device as recited in claim 5, wherein the second execution time associated with executing the second access command in the FIFO order is an average execution time of the access commands.

8. The data storage device as recited in claim 1, wherein the control circuitry is further configured to:
store at least two access commands in the host queue;
sort the at least two access commands in the host queue into an execution order based on a rotation-position-optimization algorithm; and
select the first access command based on the execution order.

9. The data storage device as recited in claim 1, wherein the control circuitry is further configured to:
receive a configuration command from the host to emulate a depth of a host-only queue in the absence of the pending queue; and
process the plurality of access commands received from the host using the host queue and the pending queue in order to emulate the depth of the host-only queue.

10. A data storage device comprising:
a non-volatile storage medium;
a head actuated over the non-volatile storage medium; and
control circuitry configured to:
receive a plurality of access commands from a host;
store at least one of the access commands in a host queue and store at least one of the access commands in a pending queue;
execute a first access command in the host queue within a first execution time needed to execute the first access command; and
during the first execution time, execute a second access command in the pending queue.

11. The data storage device as recited in claim 10, wherein after executing the first access command and the second access command, the control circuitry is further configured to:
transfer a third access command from the pending queue to the host queue based on a first-in-first-out (FIFO) order of the pending queue; and
execute the third access command in the host queue.

12. The data storage device as recited in claim 11, wherein:
executing the second access command creates a free hole command in the pending queue; and
when the free hole command reaches the host queue, the control circuitry is further configured to execute a fourth access command in the pending queue in place of the free hole command.

13. The data storage device as recited in claim 12, wherein the fourth access command is the next access command in the FIFO order of the pending queue.

14. The data storage device as recited in claim 12, wherein fourth access command is out of the FIFO order of the pending queue, thereby creating an early hole command in the pending queue.

15. The data storage device as recited in claim 11, wherein:
executing the second access command creates a free hole command in the pending queue; and
when the free hole command reaches the host queue, the control circuitry is further configured to execute a fourth access command and a fifth access command in place of the free hole command and within a second execution time associated with executing the second access command in the FIFO order.

16. The data storage device as recited in claim 10, wherein the control circuitry is further configured to:
store at least two access commands in the host queue;
sort the at least two access commands in the host queue into an execution order based on a rotation-position-optimization algorithm; and
execute the first access command based on the execution order.

17. The data storage device as recited in claim 10, wherein the control circuitry is further configured to:
receive a command from the host to emulate a depth of a host-only queue in the absence of the pending queue; and
process the plurality of access commands received from the host using the host queue and the pending queue in order to emulate the depth of the host-only queue.

18. A data storage device comprising:
a non-volatile storage medium;
a head actuated over the non-volatile storage medium;
a means for receiving a plurality of access commands from a host;
a means for storing at least one of the access commands in a host queue and storing at least one of the access commands in a pending queue;
a means for executing a first access command in the host queue within a first execution time needed to execute the first access command; and
during the first execution time, a means for executing a second access command in the pending queue.

19. The data storage device as recited in claim 18, wherein after executing the first access command and the second access command, further comprising:
a means for transferring a third access command from the pending queue to the host queue based on a first-in-first-out (FIFO) order of the pending queue; and
a means for executing the third access command in the host queue.

20. The data storage device as recited in claim 19, wherein:
   executing the second access command creates a free hole command in the pending queue; and
   when the free hole command reaches the host queue, further comprising a means for executing a fourth access command in the pending queue in place of the free hole command.

* * * * *